US010181673B1

United States Patent
Hemnani

(10) Patent No.: US 10,181,673 B1
(45) Date of Patent: Jan. 15, 2019

(54) RECEPTACLE TERMINAL FOR A JUNCTION BOX

(71) Applicant: TE CONNECTIVITY CORPORATION, Berwyn, PA (US)

(72) Inventor: Dinesh Loku Hemnani, Greensboro, NC (US)

(73) Assignee: TE CONNECTIVITY CORPORATION, Berwyn, PA (US)

( * ) Notice: Subject to any disclaimer, the term of this patent is extended or adjusted under 35 U.S.C. 154(b) by 0 days.

(21) Appl. No.: 15/991,059

(22) Filed: May 29, 2018

(51) Int. Cl.
*H01R 13/502* (2006.01)
*H01R 13/05* (2006.01)
*H01R 13/187* (2006.01)
*H02G 3/08* (2006.01)

(52) U.S. Cl.
CPC ......... *H01R 13/502* (2013.01); *H01R 13/055* (2013.01); *H01R 13/187* (2013.01); *H02G 3/081* (2013.01)

(58) Field of Classification Search
CPC .. H01R 13/055; H01R 13/502; H01R 13/187; H01R 11/32; H01R 11/03; H01R 11/07
See application file for complete search history.

(56) References Cited

U.S. PATENT DOCUMENTS

| | | | |
|---|---|---|---|
| 5,588,884 A * | 12/1996 | Rudoy | H01R 13/187 439/787 |
| 5,911,605 A * | 6/1999 | Wooldridge | H01R 13/28 439/790 |
| 6,287,156 B1 * | 9/2001 | Swan | H01R 13/187 439/790 |
| 6,692,316 B2 * | 2/2004 | Hsieh | H01R 13/187 439/224 |
| 6,932,625 B2 | 8/2005 | Yagi et al. | |
| 7,241,189 B2 * | 7/2007 | Mohs | H01R 13/113 439/845 |
| 7,462,080 B2 * | 12/2008 | Shiraishi | H01R 13/113 439/852 |
| 7,766,706 B2 * | 8/2010 | Kawamura | H01R 13/112 439/833 |
| 8,668,531 B2 * | 3/2014 | Yamaguchi | H01R 13/187 439/843 |
| 8,715,018 B2 * | 5/2014 | Yoshikawa | H01R 13/187 439/850 |
| 9,190,756 B2 * | 11/2015 | Glick | H01R 13/18 |
| 9,231,326 B2 * | 1/2016 | Goesmann | H01R 13/187 |
| 9,793,620 B2 * | 10/2017 | Marsh | H01R 13/113 |
| 2003/0060090 A1 * | 3/2003 | Allgood | H01R 11/289 439/845 |
| 2015/0024629 A1 * | 1/2015 | Snader | H01R 13/5219 439/607.01 |
| 2017/0346248 A1 * | 11/2017 | Eckel | H01R 13/22 |

* cited by examiner

*Primary Examiner* — Briggitte R Hammond

(57) ABSTRACT

A receptacle terminal includes a main box and a transverse box. The main box has a front, a rear, sides and ends extending between the front and the rear. The main box has a main blade slot open at the rear configured to receive a first blade terminal along a main plane. The main box has a deflectable spring contact configured to engage the first blade terminal when received in the main blade slot. The transverse box has a front, a rear, sides and ends extending between the front and the rear. The transverse box has a transverse blade slot open at the front configured to receive a second blade terminal along a transverse plane. The transverse box is oriented relative to the main box such that the transverse plane is perpendicular to the main plane.

20 Claims, 4 Drawing Sheets

US 10,181,673 B1

RECEPTACLE TERMINAL FOR A JUNCTION BOX

BACKGROUND OF THE INVENTION

The subject matter herein relates generally to receptacle terminals for a junction box.

Junction boxes are used to electrically connect electrical devices and electrical components. For example, junction boxes may be used as battery distribution units for battery systems for electric vehicles or hybrid vehicles. The junction box manages the power capacity and functionality of the battery system by electrically connecting electrical components, such as relays, fuses or other electrical components to electrical devices, such as sensors, connectors, bus bars or other devices.

Conventional junction boxes may use wire harnesses or other connecting elements to electrically connect the various components and devices. Assembly using wire harnesses is time consuming. Other conventional junction boxes use terminals to connect the various components and devices. However, the terminals are typically bulky, increasing the overall size of the junction box. The terminals may have high mating forces, requiring the use of lubrication to lower the mating forces and improve performance. Additionally, conventional terminals may have specific mating requirements and may limit the size or shape of the components the terminals are connected to. Conventional terminals may require that the blade terminals be oriented parallel to each other requiring complex routing or positioning of the components and devices for mating, which may occupy additional space in the junction boxes making the junction boxes larger.

There is a need for a robust electrical terminal for use in junction boxes.

BRIEF DESCRIPTION OF THE INVENTION

In one embodiment, a receptacle terminal is provided including a main box and a transverse box. The main box has a front and a rear, first and second sides extending between the front and the rear, and first and second ends extending between the front and the rear. The main box has a main blade slot open at the rear configured to receive a first blade terminal along a main plane. The main box has a deflectable spring contact configured to engage the first blade terminal when received in the main blade slot. The transverse box has a front and a rear, first and second sides extending between the front and the rear, and first and second ends extending between the front and the rear. The transverse box has a transverse blade slot open at the front configured to receive a second blade terminal along a transverse plane. The transverse box is oriented relative to the main box such that the transverse plane is perpendicular to the main plane.

In another embodiment, a receptacle terminal is provided including a main box having a front and a rear, first and second sides extending between the front and the rear, and first and second ends extending between the front and the rear. The main box has a main blade slot open at the rear configured to receive a first blade terminal along a main plane. The main box has a deflectable spring contact configured to engage the first blade terminal when received in the main blade slot. The receptacle terminal includes a transverse box having a front and a rear, first and second sides extending between the front and the rear, and first and second ends extending between the front and the rear. The transverse box has a transverse blade slot open at the front configured to receive a second blade terminal along a transverse plane oriented transverse to the main plane. The first end of the transverse box is split including a first flap and a second flap facing each other at a seam. The first flap and the second flap are independently movable relative to each other and are spring biased against the second blade terminal when received in the transverse blade slot.

In another embodiment, a junction box configured to hold an electrical component having a component blade terminal and an electrical device having a device blade terminal is provided including a housing holding the electrical device and a receptacle terminal coupled to the device blade terminal of the electrical device. The receptacle terminal includes a main box having a main blade slot configured to receive a device blade terminal of the electrical device along a main plane and a transverse box having a transverse blade slot configured to receive a component blade terminal of the electrical component along a transverse plane perpendicular to the main plane. The receptacle terminal has a front and a rear. The main blade slot is open at the rear and the transverse blade slot is open at the front.

DETAILED DESCRIPTION OF THE INVENTION

Figure 1:
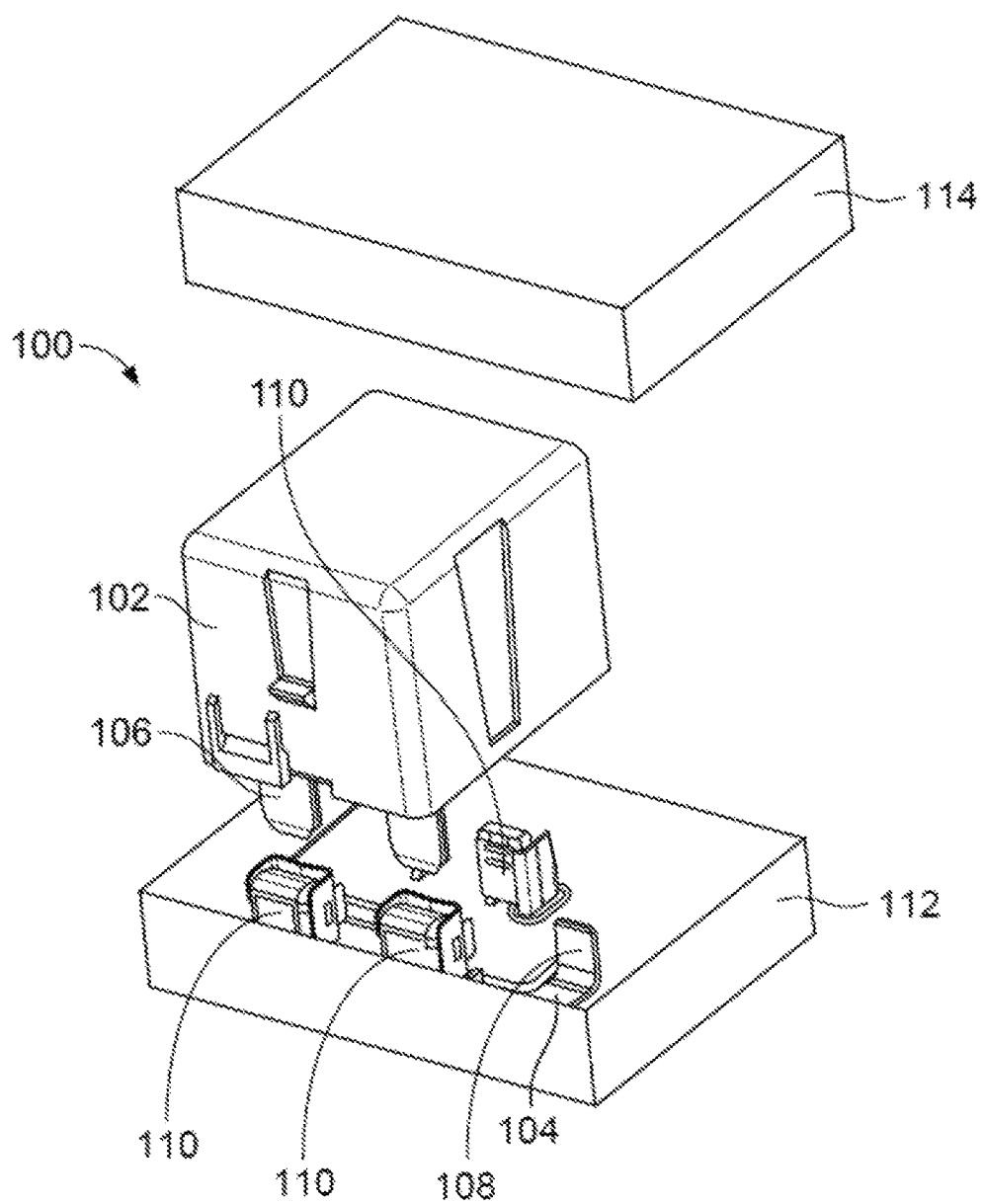
FIG. 1 illustrates a junction box in accordance with an exemplary embodiment.

FIG. 1 illustrates a junction box 100 in accordance with an exemplary embodiment. The junction box 100 is used to electrically connect one or more electrical components 102 and one or more electrical devices 104. The junction box 100 includes one or more receptacle terminals 110 configured to be electrically connected to corresponding electrical components 102 and/or corresponding electrical devices 104. In an exemplary embodiment, the receptacle terminal 110 is a double ended receptacle terminal configured to receive blade terminals 106, 108 from corresponding electrical components 102 and electrical devices 104, respectively. For example, the receptacle terminal 110 receives a blade terminal 106, such as a component blade terminal from the electrical component 102, at a front of the receptacle terminal 110 and the receptacle terminal 110 receives a blade terminal 108, such as a device blade terminal from the electrical device 104, at a rear of the receptacle terminal 110. The receptacle terminal 110 electrically connects the component blade terminal 106 of the electrical component 102 with the device blade terminal 108 of the electrical device 104. In other various embodiments, the receptacle terminal 110 may receive other types of blade terminals or the same types of blade terminals. For example, the receptacle terminal 110 may receive first and second blade terminals that are both device blade terminals 108 or that are both component blade terminals 106.

In an exemplary embodiment, the junction box 100 is used with a battery system. For example, the junction box may be a battery distribution unit (BDU) of a battery pack. The battery pack and the BDU may be part of a high voltage energy storage system. For example, the battery pack and the BDU may be used in an automotive application, such as part of an electric vehicle or a hybrid electric vehicle. The BDU is used to manage the power capacity and functionality of the battery system, such as by measuring current and regulating power distribution of the battery pack. The battery system may have both a high current power circuit and a low current power circuit, both electrically connected to the battery pack through the BDU. The BDU may monitor and/or control the operation of the components of the battery system. The BDU may measure or react to the battery health of the battery pack. The BDU may measure or react to the battery status of the battery pack. The BDU may monitor for or react to overvoltage and/or low voltage situation with the battery pack. The BDU may react due to the temperature changing of the battery pack. The BDU may manage charging functions of the battery pack. The BDU may have external connections and/or connectors, such as for attaching power terminals to the BDU and/or the battery pack, for attaching sensors to the BDU, for communicating data to/from the BDU, and the like. The electrical components 102 and electrical devices 104 may form components of the BDU.

The junction box 100 includes a housing 112 for holding the electrical components 102 and electrical devices 104 and a cover 114 (a portion of which is shown in FIG. 1) for covering the electrical components 102 and electrical devices 104 therein. In an exemplary embodiment, the housing 112 is manufactured from a dielectric material, such as a plastic material. In an exemplary embodiment, the receptacle terminals 110 are coupled to the blade terminals 108 of corresponding electrical devices 104. For example, the receptacle terminals 110 are plugged onto the blade terminals 108. In other various embodiments, the receptacle terminals 110 may be held by the housing 112 and the electrical devices 104 are then coupled to the housing 112 such that the blade terminals 108 are plugged into the receptacle terminals 110.

In various embodiments, the electrical devices 104 include printed circuit boards, leadframes, buss bars, wire harnesses, electrical connectors, or other components including or having terminals, such as the blade terminals 108 for electrical connection to the receptacle terminals 110. The electrical devices 104 may include a positive battery terminal and a negative battery terminal for electrical connection with other components, such as the battery system. The battery terminals may be electrically connected to other electrical devices 104, such as by corresponding printed circuit boards, leadframes, buss bars, wire harnesses, and the like. The electrical devices 104 may include one or more sensor connectors, control modules, and the like for controlling functions of the junction box 100. The electrical devices 104 may include a manual service disconnect (MSD) for disconnecting power circuits of the junction box 100, such as for service.

In various embodiments, the electrical components 102 are removably coupled to the junction box 100. For example, the electrical components 102 are coupled to the junction box 100 by plugging the blade terminals 106 into the receptacle terminals 110. The blade terminals 106 are flat terminals having a generally rectangular shape. Distal ends of the blade terminals 106 may be chamfered to facilitate mating with the receptacle terminals 110. Any type of electrical components 102 may form part of the junction box 100 depending on the particular application. For example, the electrical components 102 may include a power relay, a pre-charge relay, a pre-charge resister, a fuse, a capacitor, a sensor, and the like.

In various embodiments, the electrical devices 104 define electrical paths between corresponding electrical components 102. For example, the electrical device 104 may include a strip busbar that are routed within the housing 112 between the corresponding electrical components 102. However, in alternative embodiments, the electrical device 104 may include a printed circuit board having the blade terminals 108 mounted thereto for electrical connection to the electrical components 102 via the receptacle terminals 110. Optionally, the electrical devices 104 are held in the housing 112 and coupled to the receptacle terminals 110 from below while the electrical components 102 are coupled to the receptacle terminals 110 from above.

The receptacle terminals 110 allow convenient and simple connections to the blade terminals 106, 108. In an exemplary embodiment, the receptacle terminals 110 are transverse receptacle terminals configured to receive the blade terminals 106, 108 in non-parallel orientations. For example, in various embodiments, the receptacle terminals 110 may receive the blade terminals 106, 108 at right-angles to each other. For example, while both blade terminals 106, 108 may be vertically oriented, the flat sides of the blade terminals 106 may be oriented along an X-axis while the flat sides of the blade terminals 108 may be oriented along a Y-axis, or vice versa, or along other perpendicular axes. The receptacle terminals 110 allow the electrical components 102 to be quickly plugged in or unplugged from the junction box 100. The receptacle terminals 110 may eliminate some or all wired connections to the electrical components 102, reducing assembly time of the junction box 100.

Figure 2:
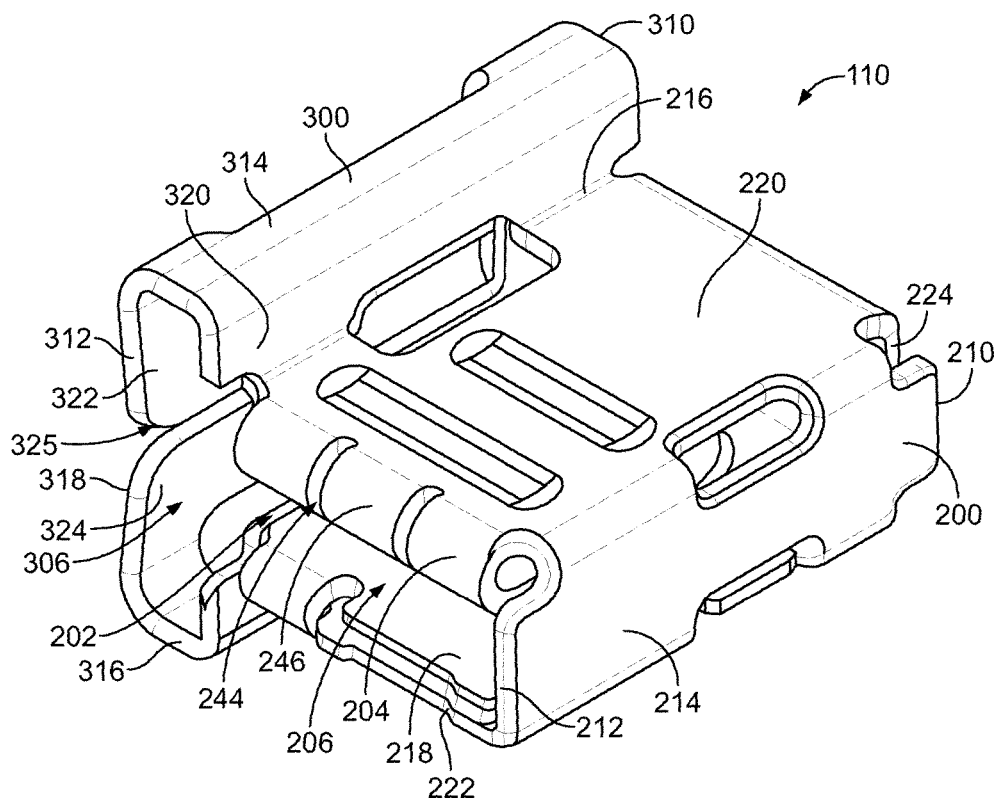
FIG. 2 is a rear perspective view of a receptacle terminal formed in accordance with an exemplary embodiment.
Figure 3:
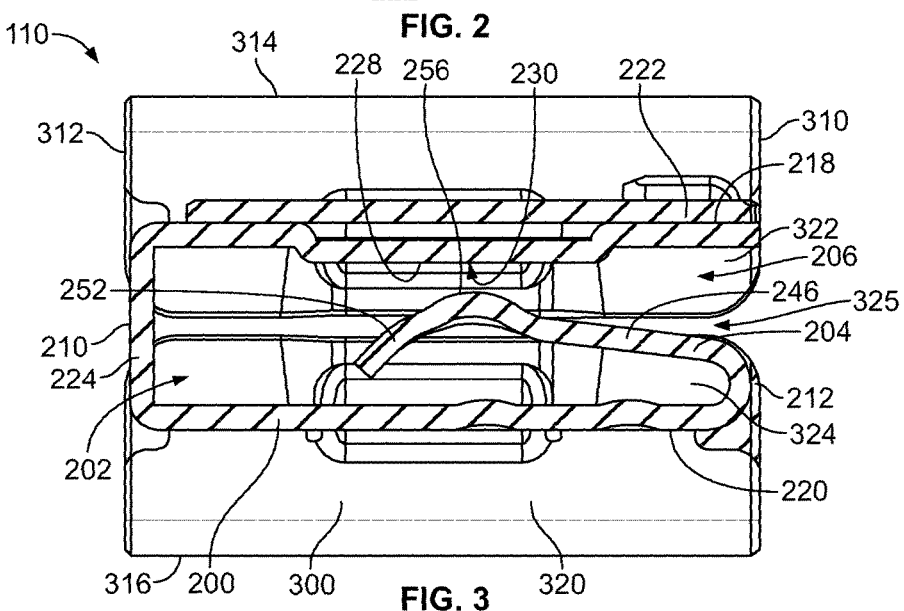
FIG. 3 is a cross-sectional view of the receptacle terminal shown in FIG. 3.
Figure 4:
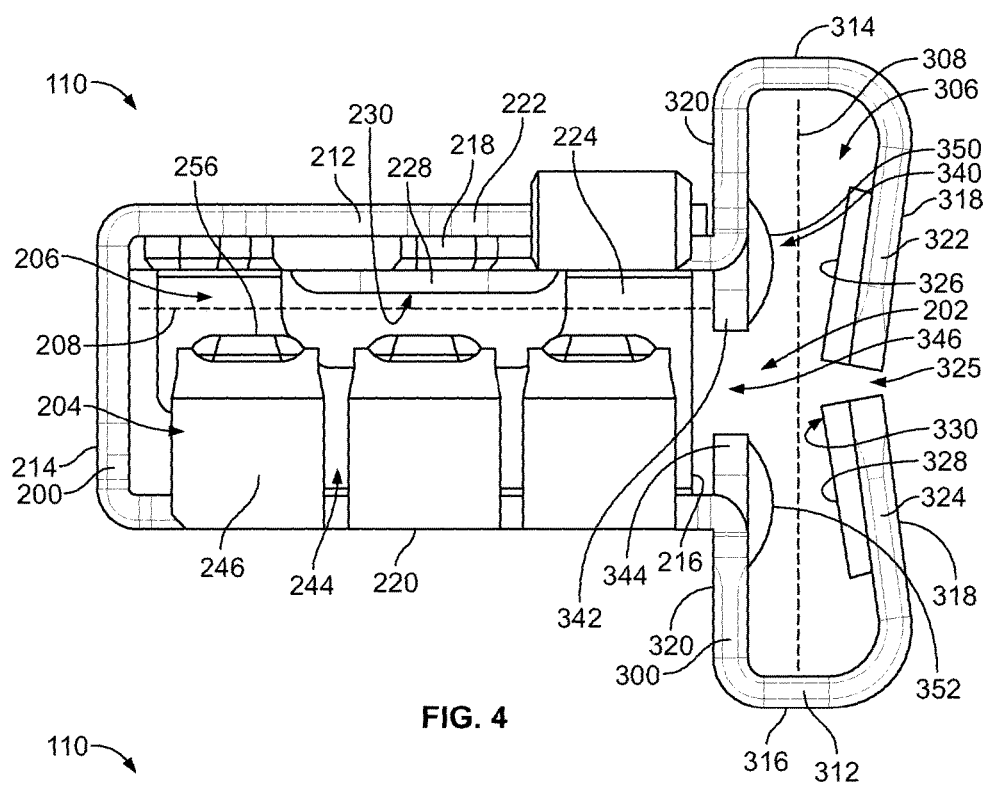
FIG. 4 is a rear view of the receptacle terminal shown in FIG. 3.
Figure 5:
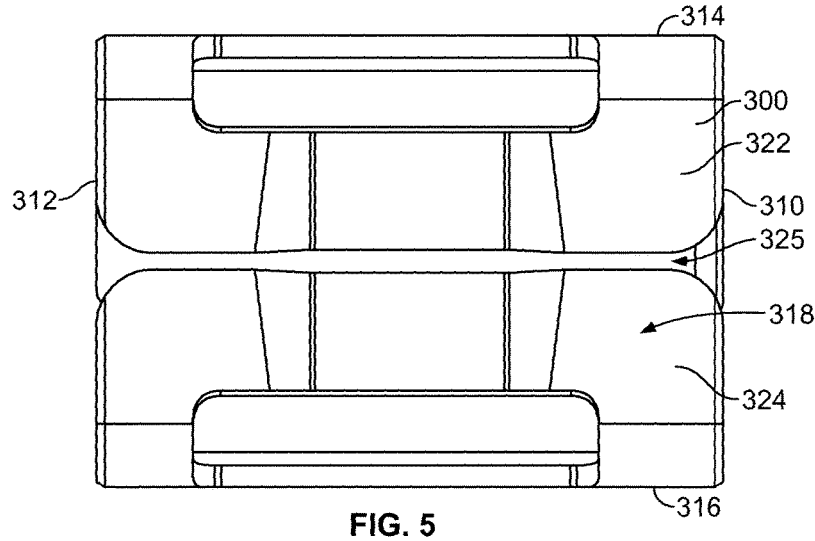
FIG. 5 is an end view of the receptacle terminal shown in FIG. 3.

FIG. 2 is a rear perspective view of one of the receptacle terminals 110 formed in accordance with an exemplary embodiment. FIG. 3 is a cross-sectional view of the receptacle terminal 110 shown in FIG. 3. FIG. 4 is a rear view of the receptacle terminal 110 shown in FIG. 3. FIG. 5 is an end view of the receptacle terminal 110 shown in FIG. 3.

The receptacle terminal 110 includes a stamped and formed body formed into a main box 200 and a transverse box 300. The receptacle terminal 110 includes a plurality of wall segments forming the main box 200 and the transverse box 300. The wall segments define a cavity 202 configured to receive the blade terminals 106, 108 (both shown in FIG. 1). In an exemplary embodiment, the cavity 202 includes a main blade slot 206 configured to receive the device blade terminal 108 and a transverse blade slot 306 configured to receive the component blade terminal 106. Optionally, the main blade slot 206 may be configured to receive the component blade terminal 106 and the transverse blade slot 306 may be configured to receive the device blade terminal 108.

In the illustrated embodiment, the main blade slot 206 and the transverse blade slot 306 are at right-angles to each other to form a T-shaped cavity 202 configured to receive the blade terminals 106, 108 in different, perpendicular orientations. For example, the main blade slot 206 extends along a main plane 208 (FIG. 4) and the transverse blade slot 306 extends along a transverse plane 308 (FIG. 4) that is transverse to the main plane 208. In the illustrated embodiment, the transverse plane 308 is perpendicular to the main plane 208; however, the transverse plane 308 may be at other non-parallel angles to the main plane 208.

The main box 200 includes a spring contact 204 extending into the main blade slot 206. The spring contact 204 is configured to be electrically connected to the device blade terminal 108. The spring contact 204 is deflectable and configured to be spring biased against the device blade terminal 108 when the device blade terminal 108 is received in the main blade slot 206.

The main box 200 includes a front 210 and a rear 212. The main box 200 has first and second sides 214, 216 extending between the front 210 and the rear 212. The main box 200 has first and second ends 218, 220 extending between the front 210 and the rear 212. The sides 214, 216 extend from the second end 220 and, in the illustrated embodiment, are generally perpendicular to the second end 220. In an exemplary embodiment, the second side 216 is open to the transverse blade slot 306. For example, the second side 216 is non-continuous such that the cavity 202 is continuous between the main box 200 and the transverse box 300.

In an exemplary embodiment, the main box 200 includes a flap 222 along the first end 218. The flap 222 is folded over the first end 218 to double the thickness of the first end 218. The flap 222 adds rigidity to the main box 200. Optionally, the flap 222 extends from the first side 214 and is folded over the first end 218; however, the flap 222 may be folded over from another wall, such as the first end 218 or elsewhere.

The main blade slot 206 is defined between the spring contact 204 and the first end 218. In an exemplary embodiment, the first end 218 includes one or more pads 228 configured to engage the device blade terminal 108 when the device blade terminal 108 is received in the main blade slot 206. The pad 228 extends inward into the cavity 202. For example, the pad 228 is formed and bent inward relative to other portions of the first end 218. Optionally, the pad 228 may be approximately centered between the front 210 and the rear 212; however, the pad 228 may be at other locations in alternative embodiments. The pad 228 defines a mating interface 230 configured to engage the device blade terminal 108 when received in the main blade slot 206. The pad 228 defines one or more points of contact with the device blade terminal 108. The main box 200 may have other features defining the contact points of the mating interface 230. For example, protrusions, bumps, tabs, spring beams or other elements may be formed on or extend from the first end 218, or elsewhere, to define the mating interface 230.

In an exemplary embodiment, the main blade slot 206 is open at the rear 212. The main blade slot 206 is defined between the first end 218 and the spring contact 204. For example, the spring contact 204 extends from the second end 220, at the rear 212, into the cavity 202. In an exemplary embodiment, the spring contact 204 is wrapped around and folded over the second end 220 within the cavity 202 to define a mating interface 240 configured to engage the device blade terminal 108 when received in the main blade slot 206. In the illustrated embodiment, the main blade slot 206 is closed at the front 210, such as by a front wall segment 224.

In an exemplary embodiment, the spring contact 204 is divided by grooves or slots 244 into a plurality of beams 246. The beams 246 are cantilevered from the second end 220. The beams 246 are movable independent of each other. Each of the beams 246 extends to a distal end 252. The mating interface 240 may be provided proximate to the distal end 252. Optionally, the beam 246 may be angled non-parallel to the first end 218 and the second end 220.

In an exemplary embodiment, the beam 246 includes a pad 256 defining the mating interface 240. The pad 256 may be a bump or protrusion extending into the main blade slot 206 to engage the device blade terminal 108 when received therein. The pad 256 may be aligned with the pad 228 at the first end 218. For example, the pad 256 may be approximately centered between the front 210 and the rear 212. The mating interface 240 of the spring contact 204 has multiple points of contact with the device blade terminal 108. For example, each of the beams 246 includes a corresponding pad 256 configured to independently engage the device blade terminal 108.

The main blade slot 206 is narrower between the pads 256, 228 and wider at the opening at the rear 212. When the device blade terminal 108 is received in the main blade slot 206, the spring contact 204 may be deflected downward to accommodate the device blade terminal 108. Such deflection causes an internal spring bias in the spring contact 204 to compress the device blade terminal 108 between the spring contact 204 and the first end 218 to ensure a strong mechanical and electrical connection between the receptacle terminal 110 and the device blade terminal 108.

Optionally, the transverse box 300 may include a spring contact (not shown) similar to the spring contact 204 extending into the transverse blade slot 306. The spring contact may be electrically connected to the component blade terminal 106. The spring contact may be deflectable and configured to be spring biased against the component blade terminal 106 when the component blade terminal 106 is received in the transverse blade slot 306.

The transverse box 300 includes a front 310 and a rear 312, which may be coplanar with the front 210 and/or the rear 212, respectively. The transverse box 300 has first and second sides 314, 316 extending between the front 310 and the rear 312. The transverse box 300 has first and second ends 318, 320 extending between the front 310 and the rear 312. The sides 314, 316 extend from the second end 320 and, in the illustrated embodiment, are generally perpendicular to the second end 320.

In the illustrated embodiment, the transverse box 300 is oriented perpendicular to the main box 200 such that the sides 314, 316 are perpendicular to the sides 214, 216 of the main box 200 and such that the ends 318, 320 are perpendicular to the ends 218, 220. In an exemplary embodiment, the second end 320 of the transverse box 300 is provided at the second side 216 of the main box 200. For example, the wall segments defining the second end 320 are coincident with the second side 216. The wall segments defining the second end 320 may be bent or formed at right angles from the first and second ends 218, 220. Optionally, the first side 314 of the transverse box 300 is beyond (for example, above) the first end 218 of the main box 200 and the second side 316 of the transverse box 300 is beyond (for example, below) the second end 220 of the main box 200. For example, the receptacle terminal 110 is T-shaped. In other alternative embodiments, the receptacle terminal 110 may have other shapes, such as an L-shape. For example, the first side 314 of the transverse box 300 may be generally coplanar with the first end 218 of the main box 200 or the second side 316 of the transverse box 300 may be generally coplanar with the second end 220 of the main box 200.

In an exemplary embodiment, the first end 318 is open. For example, the first end 318 is non-continuous. The first end 318 includes a first flap 322 and a second flap 324 with a seam 325 between the first flap 322 and the second flap 324. The first flap 322 extends inward toward the second flap 324 from the first side 314. The second flap 324 extends inward toward the first flap 322 from the second side 316. Optionally, the first flap 322 and the second flap 324 may be close to touching at the seam 325. In other various embodiments, the first flap 322 may engage the second flap 324 at the seam 325. In an exemplary embodiment, the flaps 322, 324 are angled inward into the transverse blade slot 306. For example, the transverse blade slot 306 may be wider at the sides 314, 316 and narrower at the seam 325. Optionally, the flaps 322, 324 are nonparallel to the second end 320. Optionally, the flaps 322, 324 are non-perpendicular relative to the sides 314, 316, but rather are angled at an acute angle relative to the corresponding sides 314, 316.

In an exemplary embodiment, having the first end 318 open allows deflection of the flaps 322, 324 when the component blade terminal 106 is loaded in the transverse blade slot 306. Deflection of the flaps 322, 324 may cause deflection of the sides 314, 316. When the flaps 322, 324 and/or the sides 314, 316 are deflected, the metal of the transverse box 300 is elastically deformed such that the flaps 322, 324 are spring biased against the component blade terminal 106. The transverse box 300 is enlarged when the component blade terminal 106 is loaded in the transverse blade slot 306 when the first flap 322 and/or the first side 314 are spread apart from the second flap 324 and/or the second side 316.

In an exemplary embodiment, the first end 318 includes one or more pads configured to engage the component blade terminal 106 when the component blade terminal 106 is received in the transverse blade slot 306. For example, the first flap 322 includes a first pad 326 and the second flap 324 includes a second pad 328. The pads 326, 328 extend inward into the transverse blade slot 306. For example, the pads 326, 328 are formed and bent inward relative to other portions of the flaps 322, 324. Optionally, the pads 326, 328 may be approximately centered between the front 310 and the rear 312; however, the pads 326, 328 may be at other locations in alternative embodiments.

The first end 318 has a mating interface 330 configured to engage the component blade terminal 106 when received in the transverse blade slot 306. In an exemplary embodiment, the mating interface 330 may be defined by the pads 326, 328. For example, the pads 326, 328 may include flat portions that are the innermost portions of the pads 326, 328 and that define the mating interface 330. Optionally, the mating interface 330 has multiple points of contact with the component blade terminal 106. For example, the first flap 322 defines part of the mating interface 330 and the second flap 324 defines another part of the mating interface 330. The first pad 326 of the first flap 322 defines a point of contact with the component blade terminal 106 and the second pad 328 of the second flap 324 defines another point of contact with the component blade terminal 106. In alternative embodiments, rather than having the pads 326, 328, the flaps 322, 324 may have other features defining the contact points of the mating interface 330. For example, protrusions, bumps, tabs, spring beams or other elements may be formed on or extend from the flaps 322, 324 to define the mating interface 330.

In an exemplary embodiment, the transverse blade slot 306 is open at the front 310. The transverse blade slot 306 is defined between the first end 318 and the second end 320. The transverse blade slot 306 may be open at the rear 312.

In an exemplary embodiment, the second end 320 includes a mating interface 340 for mating with the component blade terminal 106. In the illustrated embodiment, the second end 320 includes tabs 342, 344 extending partially across the second side 216 of the main box 200. The tabs 342, 344 at least partially close the main blade slot 206. The tabs 342, 344 separate the main blade slot 206 from the transverse blade slot 306. The tabs 342, 344 are separated by a gap 346. The gap 346 defines part of the cavity 202. The gap 346 connects the main blade slot 206 and the transverse blade slot 306. In an exemplary embodiment, the tabs 342, 344 include pads 350, 352 extending into the transverse blade slot 306. The pads 350, 352 define the mating interface 340. The pads 350, 352 are bumps or protrusions extending into the transverse blade slot 306 to engage the component blade terminal 106 when received therein. The pads 350, 352 may be aligned with the pads 326, 328 at the first end 318. For example, the pads 350, 352 may be approximately centered between the front 310 and the rear 312. The transverse blade slot 306 is narrower between the pads 326, 350 and 328, 352 and wider at the sides 314, 316.

When the component blade terminal 106 is received in the transverse blade slot 306, the first end 318 may be opened. For example, the flaps 322, 324 may be deflected outward to accommodate the component blade terminal 106. The tabs 342, 344 may be deflected outward to accommodate the component blade terminal 106. Such deflection causes an internal spring bias in the transverse box 300 at the first end 318 and/or at the second end 320 such that the transverse box 300 presses against one side of the component blade terminal 106 to ensure a strong mechanical and electrical connection between the receptacle terminal 110 and the component blade terminal 106. The transverse box 300 has multiple points of contact with the component blade terminal 106. For example, the pads 326, 328 each define one or more points of contact with one side of the component blade terminal 106 and the pads 350, 352 each define one or more points of contact with the other side of the component blade terminal 106.

In an exemplary embodiment, a portion of the transverse box 300 extends from the first end 218 of the main box 200. For example, a portion of the first end 318 of the transverse box 300, the first side 314 of the transverse box 300, and the first flap 322 of the transverse box 300 extend from the first end 218 of the main box 200. The front wall segment 224 extends from the first end 218 of the main box 200 at the front 310. In an exemplary embodiment, the second end 220 of the main box 200 extends from the front wall segment 224. The spring contact 204 extends from the second end 220 at the rear 212 opposite the front wall segment 224. The first side 214 of the main box 200 extends from the second end 220. The flap 222 extends from the first side 214. A portion of the transverse box 300 extends from the second end 220 of the main box 200. For example, a portion of the second end 320 of the transverse box 300, the second side 316 of the transverse box 300, and the second flap 324 of the transverse box 300 extend from the second end 220 of the main box 200.

In an exemplary embodiment, the receptacle terminal 110 is formed by folding the spring contact 204 into shape. The receptacle terminal 110 is formed by forming up the portions of the transverse box 300. The receptacle terminal 110 is formed by folding the first end 218 and/or the second end 220 at the front wall segment 224. The receptacle terminal 110 is formed by folding the side 214 and the flap 222 around the spring contact 204 and the first end 218. The receptacle terminal 110 may have other wall segments in other embodiments and/or the various wall segments may be connected to each other at different fold lines or in a different pattern in alternative embodiments.

Figure 6:
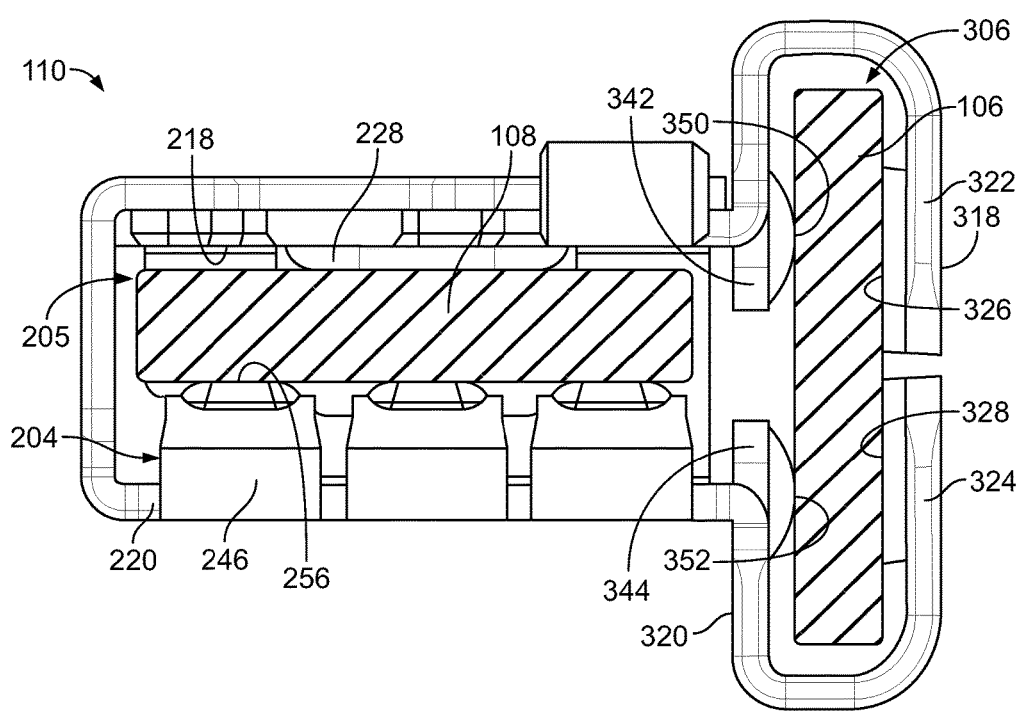
FIG. 6 is a rear view of the receptacle terminal showing blade terminals therein.

FIG. 6 is a rear view of the receptacle terminal 110 showing the device blade terminal 108 and the component blade terminal 106 in the main blade slot 206 and the transverse blade slot 306, respectively. During assembly, the receptacle terminal 110 may be coupled to the device blade terminal 108 by loading the receptacle terminal 110 onto the device blade terminal 108. The device blade terminal 108 is received in the main blade slot 206. The device blade terminal 108 is captured between the spring contact 204 and the first end 218. The device blade terminal 108 is captured between the pad 228 and the pads 256 of the beams 246 of the spring contact 204. The spring contact 204 may be at least partially deflected when coupled to the device blade terminal 108. For example, the spring contact 204 may be pressed toward the second end 220.

During assembly, the component blade terminal 106 is coupled to the receptacle terminal 110 by loading the component blade terminal 106 into the transverse blade slot 306. The component blade terminal 106 is loaded between the tabs 342, 344 at the second end 320 and the first end 318. When the component blade terminal 106 is received between the pads 350, 352 of the tabs 342, 344 and the pads 326, 328 of the first end 218, the flaps 322, 324 are deflected outward away from the component blade terminal 106. The component blade terminal 106 is resiliently captured by the flaps 322, 324 between the pads 326, 350 and the pads 328, 352.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

What is claimed is:

1. A receptacle terminal comprising:
a main box having a front and a rear, the main box having first and second sides extending between the front and the rear, the main box having first and second ends extending between the front and the rear, the main box having a main blade slot open at the rear configured to receive a first blade terminal along a main plane, the main box having a deflectable spring contact configured to engage the first blade terminal when received in the main blade slot; and
a transverse box having a front and a rear, the transverse box having first and second sides extending between the front and the rear, the transverse box having first and second ends extending between the front and the rear, the transverse box having a transverse blade slot open at the front configured to receive a second blade terminal along a transverse plane;
wherein the transverse box is oriented relative to the main box such that the transverse plane is perpendicular to the main plane.

2. The receptacle terminal of claim 1, wherein the main box and the transverse box are integral being stamped from a single metal plate.

3. The receptacle terminal of claim 1, wherein the second side of the main box is coincident with the second end of the transverse box.

4. The receptacle terminal of claim 1, wherein the main blade slot is open to the transverse blade slot.

5. The receptacle terminal of claim 1, wherein the second side of the main box includes a pad extending into the transverse blade slot to define a mating interface for the second blade terminal.

6. The receptacle terminal of claim 1, wherein the main blade slot and the transverse blade slot form a T-shaped cavity configured to receive the first blade terminal and the second blade terminal.

7. The receptacle terminal of claim 1, wherein the transverse box is provided at the second side of the main box.

8. The receptacle terminal of claim 1, wherein the transverse blade slot is approximately centered with the main plane.

9. The receptacle terminal of claim 1, wherein the first side of the transverse block extends beyond the first end of the main box and the second side of the transverse box extends beyond the second end of the main box.

10. The receptacle terminal of claim 1, wherein the first end of the transverse box being split including a first flap and a second flap facing each other at a seam, the first flap and the second flap being independently movable relative to each other and being spring biased against the second blade terminal when received in the transverse blade slot.

11. The receptacle terminal of claim 10, wherein the first flap extends from the first side of the transverse box to the seam and the second flap extends from the second side of the transverse box to the seam, the first flap and the first side of the transverse box being spread apart from the second flap and the second side of the transverse box by the second blade terminal when the second blade terminal is loaded in the transverse blade slot.

12. The receptacle terminal of claim 1, wherein the first blade terminal is one of a device blade terminal or a component blade terminal and the second blade terminal is one of a device blade terminal or a component blade terminal.

13. A receptacle terminal comprising:
a main box having a front and a rear, the main box having first and second sides extending between the front and the rear, the main box having first and second ends extending between the front and the rear, the main box having a main blade slot open at the rear configured to receive a first blade terminal along a main plane, the main box having a deflectable spring contact configured to engage the first blade terminal when received in the main blade slot; and
a transverse box having a front and a rear, the transverse box having first and second sides extending between the front and the rear, the transverse box having first and second ends extending between the front and the rear, the transverse box having a transverse blade slot open at the front configured to receive a second blade terminal along a transverse plane oriented transverse to the main plane, the first end of the transverse box being split including a first flap and a second flap facing each other at a seam, the first flap and the second flap being independently movable relative to each other and being spring biased against the second blade terminal when received in the transverse blade slot.

14. The receptacle terminal of claim 13, wherein the first flap extends from the first side of the transverse box to the seam and the second flap extends from the second side of the transverse box to the seam, the first flap and the first side of the transverse box being spread apart from the second flap and the second side of the transverse box by the second blade terminal when the second blade terminal is loaded in the transverse blade slot.

15. The receptacle terminal of claim 13, wherein the transverse box is oriented relative to the main box such that the transverse plane is perpendicular to the main plane.

16. The receptacle terminal of claim 13, wherein the first blade terminal is one of a device blade terminal or a component blade terminal and the second blade terminal is one of a device blade terminal or a component blade terminal.

17. A junction box configured to hold an electrical component having a component blade terminal and an electrical device having a device blade terminal, the junction box comprising:
a housing holding the electrical device; and
a receptacle terminal coupled to the device blade terminal of the electrical device, the receptacle terminal comprising a main box having a main blade slot configured to receive a device blade terminal of the electrical device along a main plane and a transverse box having a transverse blade slot configured to receive a component blade terminal of the electrical component along a transverse plane perpendicular to the main plane, the receptacle terminal having a front and a rear, the main blade slot being open at the rear, the transverse blade slot being open at the front.

18. The junction box of claim 17, wherein the transverse box is split including a first flap and a second flap facing each other at a seam, the first flap and the second flap being independently movable relative to each other and being spring biased against the component blade terminal when received in the transverse blade slot.

19. The junction box of claim 17, wherein the main box and the transverse box are integral being stamped from a single metal plate.

20. The junction box of claim 17, wherein the main blade slot and the transverse blade slot form a T-shaped cavity configured to receive the device blade terminal and the component blade terminal.

* * * * *